Dec. 17, 1935.  E. E. HEWITT  2,024,989
PISTON SEAL GASKET
Filed May 25, 1932  2 Sheets-Sheet 1
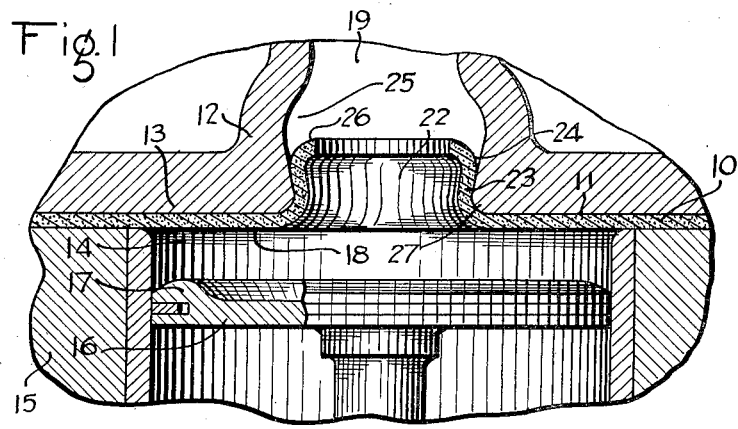
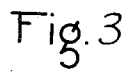
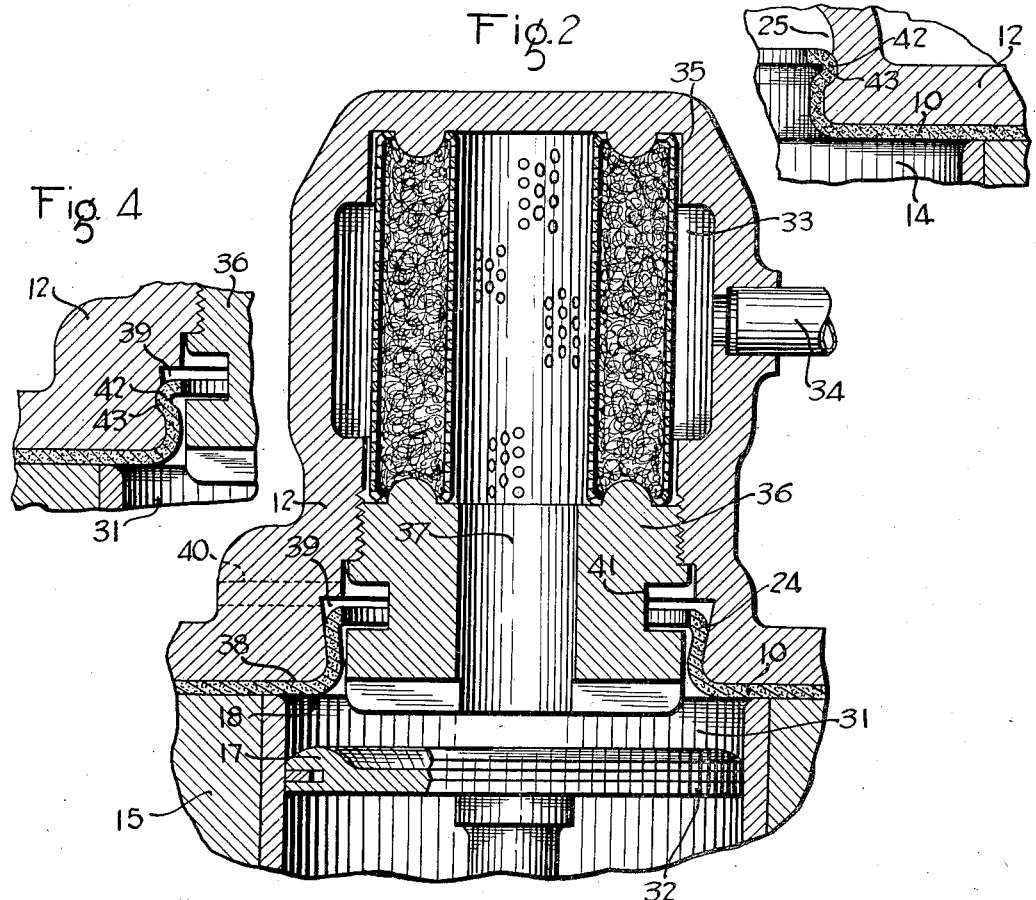
INVENTOR.
ELLIS E. HEWITT
By *Wm. M. Cady*
ATTORNEY.

Dec. 17, 1935.  E. E. HEWITT  2,024,989
PISTON SEAL GASKET
Filed May 25, 1932  2 Sheets-Sheet 2

INVENTOR.
ELLIS E. HEWITT.
BY *Wm. M. Cady*
ATTORNEY.

Patented Dec. 17, 1935

2,024,989

UNITED STATES PATENT OFFICE 2,024,989

PISTON SEAL GASKET

Ellis E. Hewitt, Edgewood, Pa., assignor to The Westinghouse Air Brake Company, Wilmerding, Pa., a corporation of Pennsylvania Application May 25, 1932, Serial No. 613,417

4 Claims. (Cl. 288—1)

This invention relates to fluid pressure brake equipment and sealing gasket structures such as are employed therein and particularly to gasket structures for triple valve devices for establishing a fluid tight seal between a valve piston and the end wall of the piston chamber.

Heretofore, difficulty has been experienced with flat gaskets having central openings because of the tendency of the central portion of the gasket to move away from its flat supporting seat due to several causes, i. e., distortion caused by pressure of the annular sealing seat of the piston upon the gasket, distortion due to compression of the marginal portion of the gasket between the casing parts, or warping of the gasket in the region of the central opening due to other causes.

Moisture and foreign particles gradually accumulate in the space thus formed between the inner face of the gasket and the supporting surface or seat therefor and prevent it from flattening against the supporting surface or seat when the piston is moved into engagement with the gasket. Consequently the sealing seat on the piston cannot make an effective sealing contact with the gasket and leakage results.

It is an object of this invention to provide a piston seal gasket and mounting therefor, wherein means are provided on the gasket for yieldingly attaching the central portion of the gasket to its supporting seat, so that it is free to expand and contract without causing permanent detrimental distortion which would impair its sealing function, and so that the central portion of the gasket surrounding the opening is sealed upon its supporting seat in such manner that foreign particles and moisture cannot gain access to the inner face of the gasket and lodge between the gasket and its supporting seat.

A further object of the invention is to provide a piston seal gasket having the above noted characteristics wherein the gasket adjacent the central opening is reenforced by an integral annular flange of flexible material that prevents warping of the gasket adjacent the opening, and which may readily be inserted within an under-cut recess constituting a part of an air passage leading to the supporting face of the gasket, within which it may expand and snugly engage the walls of the recess to form a fluid tight seal and yieldingly retain the central portion of the gasket against its supporting seat.

A further object of the invention is to provide a piston seal gasket that may be economically molded in one piece and which may readily be assembled and yieldingly and releasably retained in operative position upon its seat without the use of bolts, nuts or other attaching means. Assembly of the device is, therefore, facilitated since the gasket may be assembled upon its seat and retained thereon while the part containing the seat is being assembled with other parts of the triple valve structure.

These and other objects of the invention that will be made apparent throughout the further description thereof, are attained by the piston seal gasket structure hereinafter described and illustrated in the accompanying drawings; wherein Fig. 1 is a sectional view, partly in elevation, of a fragment of a triple valve device showing an improved piston seal gasket structure embodying features of the invention;

Fig. 2 is a sectional view, partly in elevation, of another form of piston seal gasket embodying features of the invention and employed in another part of the triple valve device;

Figs. 3 and 4 are fragmental sectional views of modified forms of the piston seal gaskets shown in Figs. 1 and 2 respectively;

Figure 5:
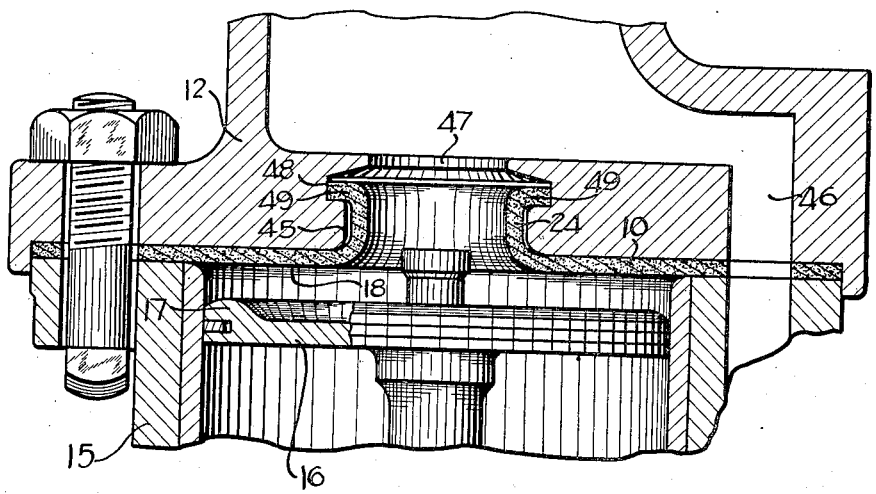
Fig. 5 is a sectional view, partly in elevation, of a fragment of a triple valve device showing a further modification of the improved piston seal gasket structure.

Referring to the drawings, and particularly to Fig. 1, the improved gasket is shown as applied to the emergency valve portion of a triple valve device of the type disclosed in the copending application Serial No. 612,465, filed May 20, 1932, of Clyde C. Farmer, and assigned to the assignee of this application.

The improved gasket 10 comprises a molded rubber or composition gasket and is adapted to be clamped in operative position between a supporting face 11 of the pipe bracket 12, which constitutes an end wall or closure 13 for one end of the piston chamber, and a casing 15 containing the chamber 14, the bracket and casing being secured together by means of the usual bolts (not shown).

A valve piston 16 for operating the slide valves (not shown) of the emergency valve portion of the triple valve device is contained within the piston chamber and is provided with an annular sealing seat 17 that is adapted to engage the sealing face of the gasket 10.

The pipe bracket 12 is provided with the usual fluid passage 19 connected to the brake pipe (not shown) and through which fluid passes from the brake pipe to the piston chamber 14 or from the piston chamber to the brake pipe when the brake pipe pressure is reduced to effect an application of the brakes through movement of the valve piston 16, which serves to move said slide valves.

The gasket 10 is provided with a central passage or channel 22, formed by an annular flange 23, constituting a bulb-like projection 24 that extends into a bulbous enlargement 25 of the passage 19, having a portion of its walls substantially conforming in general contour to that of the main portion of the projection 24. The external diameter of the projection is slightly larger than the diameter of the corresponding portion of the bulbous portion 25 of the passage 19 and the projection must be compressed slightly in order to contract so that it will pass into the enlarged portion 25 of the passage.

The edge 26 of the flange projection 24 is turned inwardly as indicated in the drawings, to stiffen the structure of the projection and to facilitate compression of the projection and insertion thereof into the large portion of the passage.

To assemble the gasket upon the supporting seat or face of the pipe bracket, the end of the projection 24 is applied to the mouth of the passage 19, so that the rounded end portion 26 of the projection engages the rounded lip 27 of the mouth of the passage 19. Pressure is then applied to the outer face of the gasket. The projection is caused to contract until the widest portion thereof passes through the narrowest portion of the mouth of the passage. The projection expands upon further movement of the projection into the passage and finally the projection and gasket assume the assembled position shown in Fig. 1. The projection tends to expand outwardly into tight engagement with the wall of the passage and as the walls of the passage taper outwardly from the lip 27 thereof, the central portion of the gasket is drawn into close contact with its supporting seat 11 upon the pipe bracket. Since the exterior surface of the projection is pressed tightly against the walls of the passage due to the compression of the projection, no dirt or foreign particles can pass the sealed engaging surfaces. Foreign particles and moisture are, therefore, simply and expeditiously excluded from the under face of the gasket. Consequently when the piston is moved into engagement with the gasket, the sealing seat of the piston will squarely engage the sealing face of the gasket and provide a fluid-tight seal between the gasket and the piston.

It is apparent that the flat body portion of the gasket between the flange projection and the portion clamped between the pipe bracket and the casing, is free to expand toward the center of the gasket without detrimental distortion thereof, since the projection may be compressed inwardly a sufficient distance to permit of expansion of the gasket in the plane of the flat face thereof without breaking the seal of the projection with the walls of the passage. The tendency of the gasket to buckle is therefore eliminated.

By the provision of the flexible projection on the central portion of the diaphragm, distortion of the diaphragm is prevented.

The gasket may readily be removed by separating the pipe bracket from the casing and then forcing the gasket away from the supporting seat by applying sufficient force to the underside thereof to cause compression of the projection.

In Fig. 2 a gasket construction similar to that disclosed in Fig. 1 is shown, the gasket being employed with the valve piston of the service valve portion of a triple valve device of the general type disclosed in the above noted copending application. Practically the only difference between the gaskets shown in Figs. 1 and 2 resides in the greater diameter of the projection 24 of the gasket shown in Fig. 2. The construction, assembly and purpose of the two gaskets are otherwise the same.

As shown in Fig. 2, the gasket 10 is clamped between a pipe bracket 12 and a casing 15, having a piston chamber 31 containing a valve piston 32 for operating the service slide valves (not shown) of the triple valve device. The pipe bracket may contain a chamber 33 connected to the brake pipe 34, and in which a filter 35 is mounted. The filter is held in position by a retaining nut 36 having a bore 37 connecting the piston chamber 31 with the chamber 33 containing the filter.

The gasket supporting seat or face 38 of the pipe bracket 12 is provided with an undercut recess 39, through which fluid under pressure may flow from the piston chamber 31 through passage 40 to a valve device (not shown) of the triple valve device or from said valve device to said piston chamber. The nut 36 is provided with an annular groove 41 which registers with the recess 39 and permits of free passage of fluid from the passage 40 through the space between the exterior surface of the nut and the inner surface of the flange projection 24 of the gasket.

The external diameter of the projection 24 is slightly greater than the diameter of the undercut recess 39 and the external surface of the projection conforms substantially in contour to the surface of the recess. When the gasket is in the assembled position shown in Fig. 2, the compressed projection snugly fits against the inclined walls of the undercut recess 39 and firmly draws the gasket into contact with the supporting seat 38. Dirt and foreign particles are excluded from the inner face of the gasket and a fluid-tight seal is obtained when the annular sealing seat 17 of the piston 32 is moved into contact with the sealing seat 18 of the gasket 10.

In Figs. 3 and 4, modified gasket structures are shown having annular beads 42 on the projection 24 for fitting snugly and under compression into an annular recess 43 in the bulbous enlargement 25 of the passage 19, and the undercut recess 39, respectively. This construction affords a fluid-tight seal between the projection and the recess in which it is inserted and a tighter grip between the projection and the wall of the recess tending to more securely anchor the central portion of the gasket upon its seat.

In Fig. 5, a further modification of the gasket and supporting structure is shown, wherein the recess 45 in the pipe bracket or casing 12, which is connected to a brake pipe passage 46 through a passage 47, is provided with an annular recess 48 for receiving an outwardly extending flange 49 on the extension 24 of the gasket 10. The flange 49 is of slightly greater external diameter than the internal diameter of the annular recess 48, and snugly engages the walls of said recess after the flange has been compressed and forced into the operative position shown. Thus a fluid-tight seal is provided which prevents foreign particles and moisture from gaining access to the inner face of the gasket. Expansion of the gasket toward its center in the plane thereof is permitted as in the constructions shown in Figs. 1 to 4.

Figure 6:
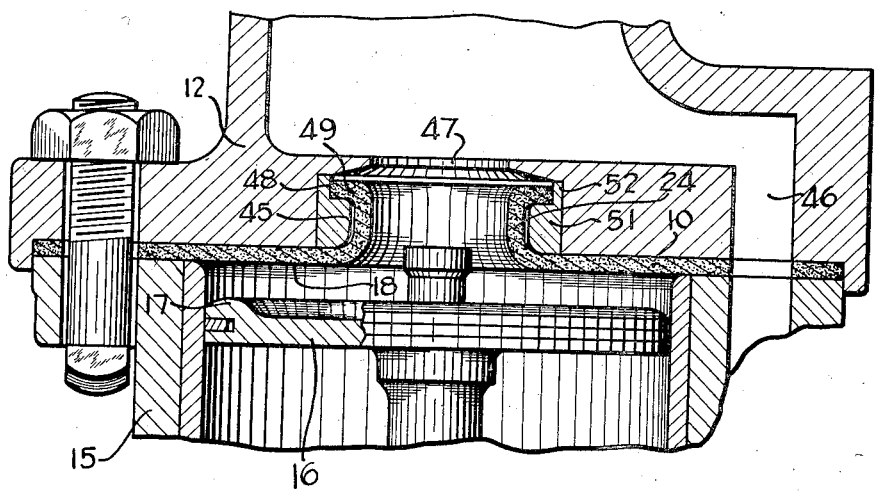
Fig. 6 is a view similar to Fig. 5 showing a modified form of supporting structure for the improved piston seal gasket shown in Fig. 5.

In Fig. 6, a modified pipe bracket construction is disclosed, wherein the recess 45 having the annular recess 48 is formed by an annular bushing 51, that is pressed or otherwise secured within a cylindrical bore 52. With this construction, it is unnecessary to place the pipe bracket or casing in a lathe chuck for forming the recess, as is the case in the construction shown in Fig. 5, but instead a less expensive boring or drilling operation may be employed for making the straight bore 52. The sleeve 51 may be made economically by automatic machinery.

The gasket employed in the construction disclosed in Fig. 6 is substantially the same as that shown in Fig. 5.

While I have shown several embodiments of the invention as applied to piston seal gaskets for triple valve equipment, it is obvious that gaskets embodying the invention may be applied to other fluid pressure devices and that changes may be made in the construction of the gaskets and the mounting therefor, without departing from the spirit of the invention.

Having now described my invention, what I claim as new and desire to secure by Letters Patent, is:

1. In a device having a pair of members adapted for receiving and clamping a gasket therebetween, one of said members having a relatively large overhang for cooperating with a sealing seat of a piston member, a gasket of resilient material clamped between said members and comprising a disc-like body portion having a central opening, said gasket being subject to axial deformation when engaged by the seat of the piston member and having an integral tubular portion constituting an extension of the inner periphery of said disc-like portion at the central opening thereof, said tubular portion being secured against axial movement and being compressible to permit inward radial expansion of said disc-like portion in the plane thereof to prevent buckling of the unsecured area of said disc-like portion.

2. In a device having a pair of members between which a gasket may be received and clamped, one of said members having a relatively large overhang and being adapted to act as an abutment for cooperating with the sealing seat of a piston member, a gasket of resilient material clamped between said members comprising a disc-like portion having a central opening, said gasket being subject to axial deformation when engaged by said piston member and having an integral tubular portion constituting an extension of the inner periphery of said disc-like portion at the central opening, said tubular portion being secured against axial movement.

3. In a device having a pair of members between which a gasket may be clamped, a gasket of resilient material clamped therebetween and comprising a disc-like body having a central opening and an integral tubular portion constituting an extension of the inner periphery of said disc-like portion at the central opening thereof, said gasket having a relatively large overhang between the clamped portion and the tubular portion thereof and being subject to axial deformation when engaged by the sealing seat of a piston member on the overhanging portion of the exposed side of the gasket tending to cause the inner portion to buckle, said tubular portion having outwardly extending radial flanges for securing the tubular portion against axial movement, the said tubular portion being compressible to permit inward radial expansion of said disc-like portion in the plane thereof to prevent buckling of the unsecured area of said disc-like portion.

4. In a device having a pair of members between which a gasket is clamped, one member having a large overhang and being adapted to act as an abutment for a piston member which causes deformation of the gasket and having a recess opening therein, a gasket of resilient material clamped between said members and comprising a disc-like portion extending over the seating face of said abutment member which disc-like portion has a central opening therein registering with said recess, and a tubular portion constituting an integral extension of the inner periphery of said disc-like portion at the central opening, said tubular portion having a radially extending flange adapted to be compressed radially inward to enter said recess, and to expand outwardly into a receiving annular groove undercut in the wall of said recess to provide a seal to prevent foreign material from entering between the abutment and the gasket.

ELLIS E. HEWITT.